(12) United States Patent
Suzuki et al.

(10) Patent No.: US 7,621,357 B2
(45) Date of Patent: Nov. 24, 2009

(54) IN-WHEEL MOTOR SYSTEM AND METHOD OF INSTALLING THE SAME

(75) Inventors: Yasuhiro Suzuki, Tokyo (JP); Katsumi Tashiro, Tokyo (JP); Hisashi Kurokawa, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 446 days.

(21) Appl. No.: 11/547,263

(22) PCT Filed: Mar. 30, 2005

(86) PCT No.: PCT/JP2005/006141

§ 371 (c)(1),
(2), (4) Date: Oct. 4, 2006

(87) PCT Pub. No.: WO2005/101984

PCT Pub. Date: Nov. 3, 2005

(65) Prior Publication Data

US 2008/0283314 A1 Nov. 20, 2008

(30) Foreign Application Priority Data

Apr. 5, 2004 (JP) ............................. 2004-111520

(51) Int. Cl.
*B60K 1/00* (2006.01)

(52) U.S. Cl. .................. 180/65.1; 180/65.51; 310/67 R

(58) Field of Classification Search ................. 180/65.1, 180/65.5, 65.51; 310/67 R
See application file for complete search history.

(56) References Cited

U.S. PATENT DOCUMENTS

| 6,364,078 | B1 * | 4/2002 | Parison et al. ............... 188/380 |
| 6,768,932 | B2 * | 7/2004 | Claypole et al. ............. 700/279 |
| 7,121,367 | B2 * | 10/2006 | Ajiro et al. ................. 180/65.5 |
| 7,216,731 | B2 * | 5/2007 | Kakinami et al. .......... 180/65.5 |
| 7,287,611 | B2 * | 10/2007 | Nagaya ..................... 180/65.5 |
| 7,421,928 | B2 * | 9/2008 | Klaus et al. ............... 74/606 R |
| 7,422,080 | B2 * | 9/2008 | Suzuki et al. .............. 180/65.5 |

* cited by examiner

*Primary Examiner*—Paul N Dickson
*Assistant Examiner*—Brian Swenson
(74) *Attorney, Agent, or Firm*—Sughrue Mion, PLLC

(57) ABSTRACT

A direct drive motor module has hollow disk-like plates (21, 22) for interconnecting the rotation side of an in-wheel motor (3) and a wheel (2) and a drive force transmission mechanism (20) comprising cross guides (23) for guiding the plates (21, 22) in the vertical direction. To mount the direct drive motor module to the wheel (2), attachment holes (2s) are formed in the spoke portions of the wheel (2), the fixing portions of connection pins (30) having a spherical pin head which is a mating portion are fitted in the attachment holes (2s), guide holes (40) having a predetermined clearance relative to the outer diameter of the pin head (33) are formed in the wheel side plate (22) supporting the wheel (2) sides of the cross guides (23), the pin heads of the connection pins (30) are mated with the guide holes (40), and the direct drive motor module is mounted to the wheel (2). The direct drive motor module can be reliably mounted to the wheel (2) even if assembly accuracy is not so high.

12 Claims, 5 Drawing Sheets

IN-WHEEL MOTOR SYSTEM AND METHOD OF INSTALLING THE SAME

BACKGROUND OF THE INVENTION

1. Field of the Invention

The present invention relates to an in-wheel motor system for use in a vehicle having direct drive wheels as drive wheels and, particularly, to a structure for mounting a member for interconnecting the rotor side of a motor and a wheel to the wheel and a method of installing the same.

2. Description of the Prior Art

It is generally known that, in a vehicle having a suspension mechanism such as a spring around a wheel, as the mass of parts under the spring such as a wheel, knuckle and suspension arm, so-called "unsprung mass" increases, changes in the ground load of a tire when running on an uneven road become larger, thereby deteriorating road holding properties.

In a vehicle driven by a motor such as an electric car, an in-wheel motor system incorporating a motor in a wheel is being employed. However, in a conventional in-wheel motor which is fixed to a spindle shaft connected to a part such as an upright or knuckle which is one of parts around a wheel of the vehicle so that a motor rotor and a wheel can turn, the above unsprung mass increases by the weight of the in-wheel motor, whereby changes in the ground load of the tire become large, thereby deteriorating road holding properties (refer to patent documents 1 to 3, for example).

To solve the above problem, the present applicant proposes an in-wheel motor system in which an in-wheel motor is installed below the spring of a vehicle by a buffer member or buffer system to be float mounted below the spring of the vehicle in order to greatly reduce changes in the ground load of a tire, thereby making it possible to improve the road holding properties of the vehicle (refer to patent document 4, for example).

FIG. 6 shows an improved version of the above in-wheel motor system. In this in-wheel motor system, a non-rotating side case 3a supporting the stator 3S of a hollow in-wheel motor 3 and a knuckle 5 are interconnected by a buffer mechanism 10 a shock absorber 12 composed of comprising a direct-acting guide member 11 for guiding in the vertical direction of the vehicle, a spring member expanding and contracting in the moving direction of this direct-acting guide member 11 and a damper to float mount the above motor 3 below the spring, and a rotating side case 3b supporting the rotor 3R of the above motor 3 and a wheel 2 are interconnected by a flexible coupling 20 comprising a hollow disk-like motor side plate 21 mounted to the rotating side case 3b of the motor, a hollow disk-like wheel side plate 22 mounted to the wheel 2, and a plurality of cross guides 23 for interconnecting the above plates 21 and 22, whose moving directions on the front and rear sides cross each other, so as to transmit the torque of the above motor 3 to the above wheel 2.

As shown in FIG. 7, each of the above cross guides 23 consists of a motor side guide rail 23A mounted to the motor side plate 21, a wheel side guide rail 23B mounted to the wheel side plate 22, and a cross guide body 23C having guide grooves 23a and 23b on the top surface and the under surface. The motor side guide rail 23A and the wheel side guide rail 23B can move along the guide grooves 23a and 23b of the cross guide body 23C in crossing directions. The above cross guide 23 is installed such that the moving direction of the above guide rail 23A becomes 45° from the radial direction of the above plate 21, whereby the above plates 21 and 22 can move in the vertical direction of the vehicle.

Thereby, the above motor 3 is elastically supported to the knuckle 5 which is a part around the wheel of the vehicle, torque is transmitted to the wheel 2 efficiently, and the motor 3 can move only in the vertical direction. Therefore, the road holding properties of the vehicle can be improved by reducing changes in the ground load of the tire. Even when the motor shaft becomes eccentric to the wheel shaft, as the flexible coupling 20 comprises the above cross guides 23, the guide rails 23A and 23B of the above cross guides 23 slide to absorb the above eccentricity.

Patent document 1: Japanese Patent No. 2676025

Patent document 2: Japanese Examined Patent Publication No. 9-506236

Patent document 3: Japanese Unexamined Patent Application No. 10-305735

Patent document 4: WO 02/083446 A1

SUMMARY OF THE INVENTION

To mount the above flexible coupling 20 to the wheel 2, in the prior art, the plurality of wheel side guide rails 23B arranged on the wheel 2 sides of the cross guides 23 are fitted in mating holes 22s formed in the above wheel side plate 22 as shown in FIG. 8.

Since the assembly accuracy of other parts is not so high though the above cross guides 23 are precision parts which require high assembly accuracy, all the wheel side guide rails 23B may not be fitted in the above mating holes 22s according to the assembly accuracy of members assembled from the motor 3 side. Even when they are fitted in the mating holes 22s, the wheel 2 may not turn, or the wheel 2 may not turn smoothly due to unrequired force applied to the wheel 2 or the flexible coupling 20.

It is an object of the present invention which has been made in view of the above problem of the prior art to provide an in-wheel motor system having a structure that enables a disk-like plate for interconnecting a direct drive motor module and a wheel to be mounted to the wheel reliably even when the assembly accuracy is not so high and a method of mounting the above disk-like plate to the wheel.

According to a first aspect of the present invention, there is provided an in-wheel motor system having a disk-like plate which is connected to a wheel and turns together with the rotor side of a direct drive motor module, comprising:

a plurality of holes formed in the disk portion of the wheel;

guide holes formed at positions corresponding to the holes of the disk-like plate; and connection pins for interconnecting the disk-like plate and the wheel, one ends of which are inserted into the hole and the other ends are inserted into the guide hole.

According to a second aspect of the present invention, there is provided an in-wheel motor system, wherein each of the connection pins has a substantially spherical mating portion to be mated with the guide hole or the hole at one end.

According to a third aspect of the present invention, there is provided an in-wheel motor system, wherein each of the connection pins has a substantially cylindrical or substantially columnar fixing portion on a side opposite to the mating portion.

According to a fourth aspect of the present invention, there is provided an in-wheel motor system, wherein each of the connection pins has a flange portion, which is arranged coaxial to the mating portion and the fixing portion and has an outer diameter larger than the diameter of the guide hole and the diameter of the hole, between the mating portion and the fixing portion.

According to a fifth aspect of the present invention, there is provided an in-wheel motor system, wherein a cylindrical fixing member for holding and fixing the fixing portion, which is an elastic member, is installed in the guide hole or the hole on the fixing portion insertion side.

According to a sixth aspect of the present invention, there is provided an in-wheel motor system, further comprising a motor side plate connected to the rotor side of the direct drive motor module and a plurality of cross guides for interconnecting the motor side plate and the disk-like plate, which are arranged in the circumferential direction of the plates and whose moving directions on the front and rear sides cross each other.

According to a seventh aspect of the present invention, there is provided an in-wheel motor system, wherein the stator side of the direct drive motor module is supported to a part around the wheel of a vehicle by an elastic body and/or an attenuation mechanism.

According to an eighth aspect of the present invention, there is provided an in-wheel motor installation method for mounting a disk-like plate which turns together with the rotor side of a direct drive motor module to a wheel, comprising the steps of:

inserting one ends of connection pins projecting toward the disk-like plate into a plurality of holes formed in the disk portion of the wheel;

inserting the direct drive motor module from the inner side of the wheel while the disk-like plate and the disk portion are kept parallel to each other; and mating the other ends of the connection pins with guide holes formed at positions corresponding to the holes of the disk-like plate.

According to a ninth aspect of the present invention, there is provided an in-wheel motor installation method, wherein each of the connection pins consists of a substantially spherical mating portion, a substantially cylindrical or substantially columnar fixing portion situated on a side opposite to the mating portion, and a flange portion interposed between the mating portion and the fixing portion, having an outer diameter larger than the diameter of the guide hole and the diameter of the hole, and arranged coaxial to the mating portion and the fixing portion, the fixing portion is held and fixed in the hole, and the mating portion is mated with the guide hole.

According to a tenth aspect of the present invention, there is provided an in-wheel motor installation method, wherein a cylindrical fixing member composed of an elastic member is installed in the hole so that the fixing portion is held and fixed in the hole.

According to an eleventh aspect of the present invention, there is provided an in-wheel motor installation method, wherein a motor side plate is mounted to the rotor side of the direct drive motor module, and the motor side plate and the disk-like plate are interconnected by a plurality of cross guides which are arranged in the circumferential direction of the plates and whose moving directions on the front and rear sides cross each other so as to transmit the rotation of the motor to the wheel.

According to a twelfth aspect of the present invention, there is provided an in-wheel motor installation method, further comprising the step of supporting the stator side of the direct drive motor module to a part around the wheel of the vehicle by an elastic body and/or an attenuation mechanism.

According to the present invention, in the in-wheel motor system having a disk-like plate which is connected to the wheel and turns together with the rotor side of the direct drive motor module, a plurality of holes are formed in the disk portion of the wheel, guide holes are formed at positions corresponding to the holes of the above disk-like plate, one ends of the connection pins for interconnecting the above disk-like plate and the wheel are fitted in the holes of the wheel, the above direct drive motor module is inserted from the inner side of the above wheel while the above disk-like plate and the above disk portion are kept parallel to each other, and the other ends of the above connection pins are mated with the guide holes of the above disk-like plate to mount the above direct drive motor module to the wheel. Therefore, if the assembly accuracy is not so high, the direct drive motor module can be mounted to the wheel reliably and the drive force of the motor can be transmitted to the wheel without fail.

When the mating portions of the above connection pins are made spherical and the connection pins are fitted in the above holes or the above guide holes through elastic members, even if the positions of the connection pins and the positions of the holes or the guide holes slightly differ from each other, the connection pins can be mated with the above holes or the above guide holes easily.

DETAILED DESCRIPTION OF THE PREFERRED EMBODIMENTS

Preferred embodiments of the present invention will be described hereinunder with reference to the accompanying drawings.

Figure 1:
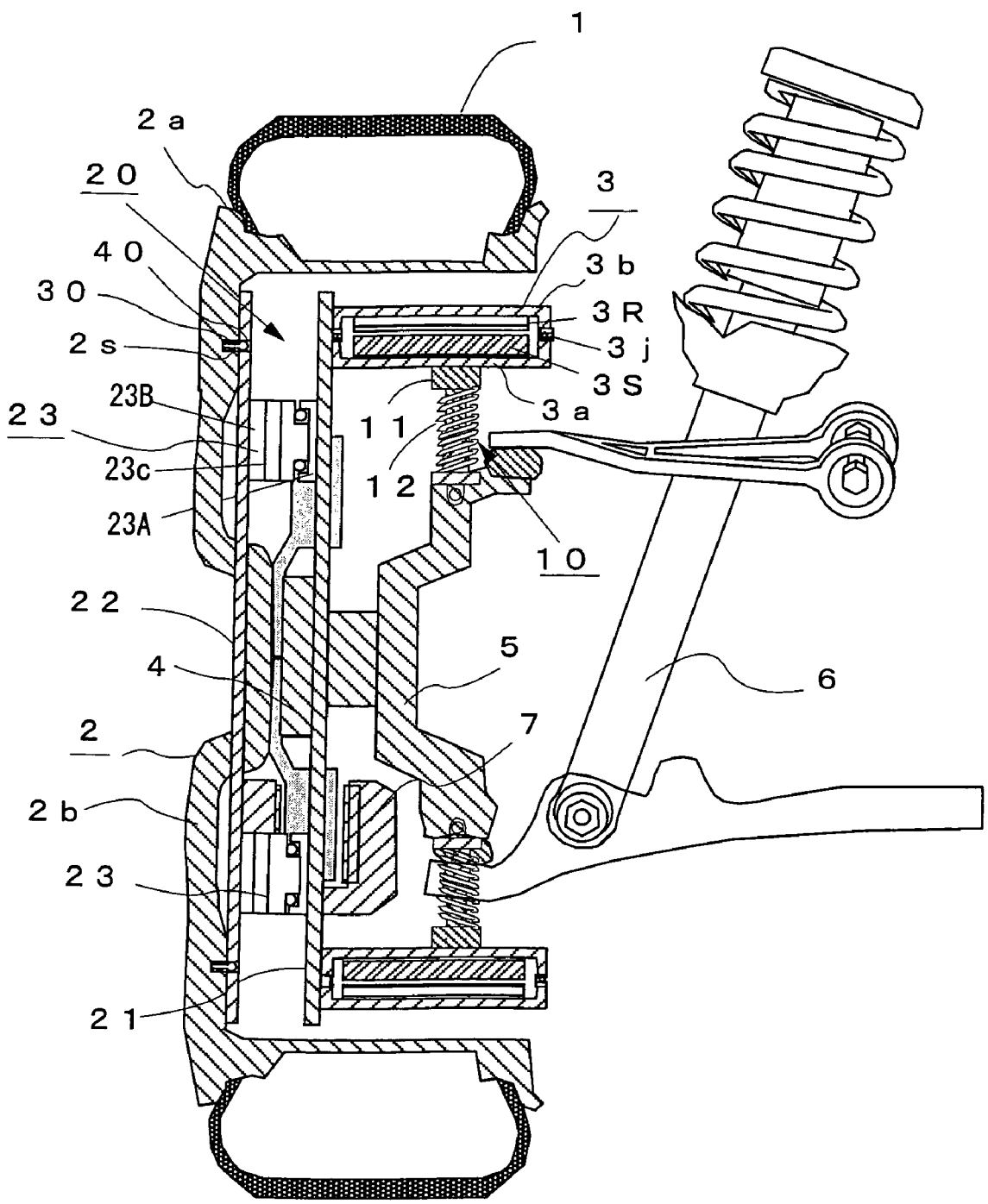
FIG. 1 is a longitudinal sectional view of an in-wheel motor system according to an embodiment of the present invention.

FIG. 1 is a longitudinal sectional view of an in-wheel motor system according to a preferred embodiment of the present invention. In FIG. 1, reference numeral 1 denotes a tire, 2 a wheel consisting of a rim 2a and a wheel disk 2b, 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction, 4 a hub connected to the wheel 2 at its rotary shaft, 5 a knuckle connected to the above hub 4 by an unshown bearing, 6 a suspension member composed of a shock absorber, 7 a brake unit composed of a brake disk mounted to the above hub 4, and 10 a buffer mechanism comprising a direct-acting guide member 11 for guiding in the vertical direction of the vehicle and a shock absorber 12 composed of a spring member which expands and contracts in the moving direction of this direct-acting guide member 11 and a damper.

Numeral 20 denotes a drive force transmission mechanism for transmitting the torque of the above motor 3 to the wheel 2 by interconnecting a motor side plate 21 connected to the rotating side case 3b of the above in-wheel motor 3 and a wheel side plate 22 mounted to the wheel 2 by means of a plurality of cross guides 23. The in-wheel motor 3, the drive force transmission mechanism 20, the hub 4, the brake unit 8 mounted to the hub 4, the knuckle 5 and the buffer mechanism 10 mounted to the knuckle 5 constitute a direct drive motor module having a disk-like plate (wheel side plate 22) which is connected to the wheel 2 and turns together with the rotor 3R of the motor 3.

Figure 2A:
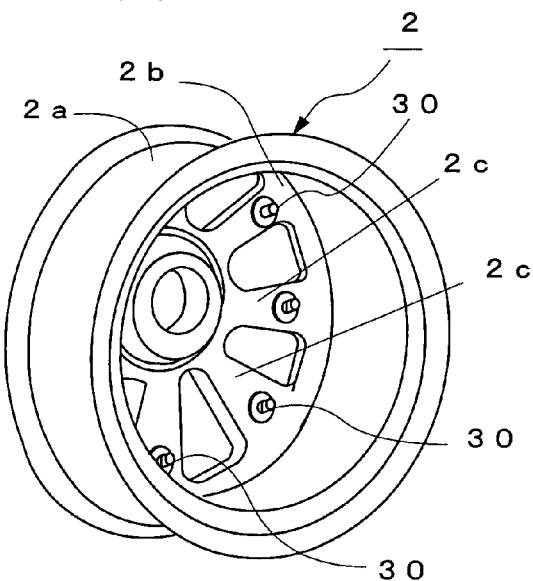
FIGS. 2(a) and 2(b) are diagrams showing the appearances of a wheel and a drive force transmission mechanism according to the embodiment of the present invention.
Figure 2B:
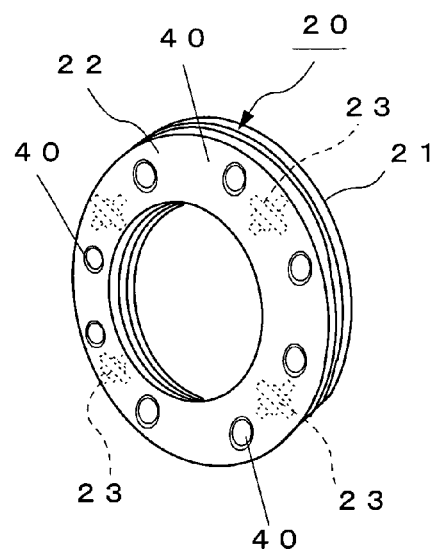

In this embodiment, as shown in FIGS. 2(a) and 2(b), a plurality of connection pins 30 projecting toward the wheel side plate 22 are provided on the spoke portions 2c of the above wheel disk 2b, guide holes 40 are formed in portions opposed to the above connection pins 30 of the wheel side plate 22, and the above connection pins 30 are inserted into the above guide holes 40 to interconnect the above wheel disk 2b and the wheel side plate 22. Since the above drive force transmission mechanism 20 is thereby connected to the above wheel 2, the direct drive motor module can be mounted to the wheel 2.

Figure 3A:
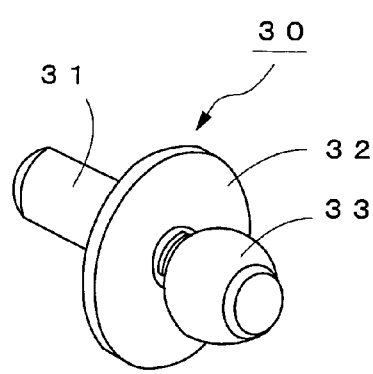
FIGS. 3(a) and 3(b) are diagrams showing a connection pin and its insertion method according to the embodiment of the present invention.
Figure 3B:
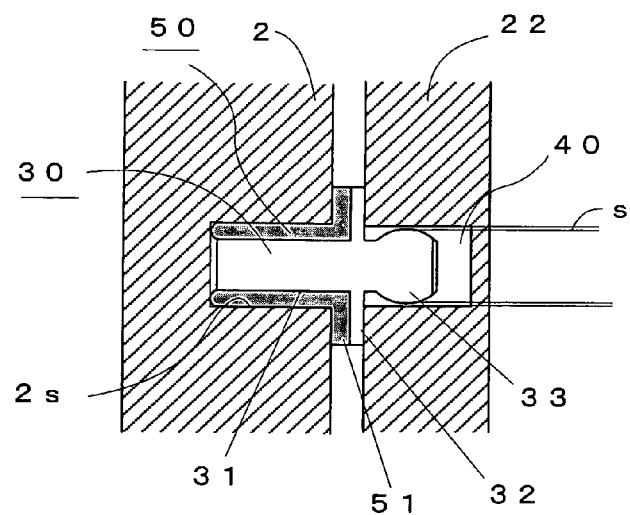

FIG. 3(a) shows an example of the connection pin of the present invention. This connection pin 30 consists of a cylindrical fixing portion 31, a flange portion 32 and a spherical pin head (mating portion) 33 projecting from the flange portion 32 toward the wheel side plate 22. By inserting the above fixing portion 31 into a cylindrical holding member 50 which is composed of an elastic member such as a resin member having a smaller inner diameter than the outer diameter of the above fixing portion 31 and buried in an attachment hole formed in the wheel 2, the above connection pin 30 is fixed in the spoke portion 2c of the wheel disk 2b. As shown in FIG. 3(b), when a flange portion 51 is provided on the above holding member 50 and the above connection pin 30 is inserted into the above holding member 50 in such a manner that the flange portion 32 of the above connection pin 30 is brought into contact with the flange portion 51 of the above holding member 50, the projection amounts of all the connection pins 30 can be made the same.

Figure 4:
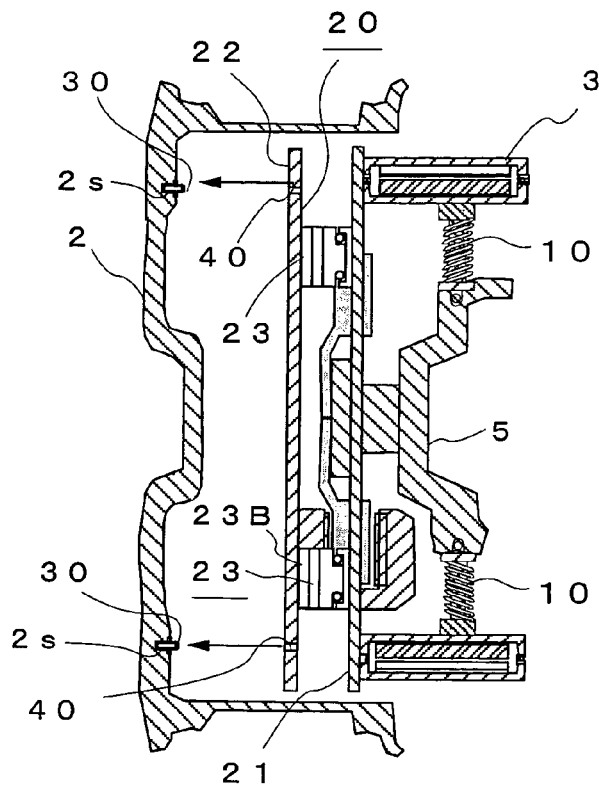
FIG. 4 is a diagram showing a method of installing an in-wheel motor system according to the embodiment of the present invention.

As shown in FIG. 4, when the above direct drive motor module is inserted from the inner side of the above wheel 2, and the pin heads 33 which are the mating portions of the above connection pins 30 are mated with the guide holes 40 in the above wheel side plate 22 to mount the above direct drive motor module to the above wheel 2 while the above wheel side plate 22 and the above wheel disk 2b are kept parallel to each other, the above direct drive motor module can be mounted to the above wheel 2 easily.

At this point, when a predetermined clearance s is provided between the above guide hole 40 and the outer diameter of the above pin head 33 as shown in FIG. 3(b), even if the assembly accuracy of members assembled from the motor 3 side is not so high, the above direct drive motor module can be mounted to the above wheel 2 reliably. Even when the position of the above connection pin 30 and the position of the above guide hole 40 slightly differ from each other as shown in FIG. 5(a), the above connection pin 30 can be inserted into the above guide hole 40.

Figures 5A, 5B:
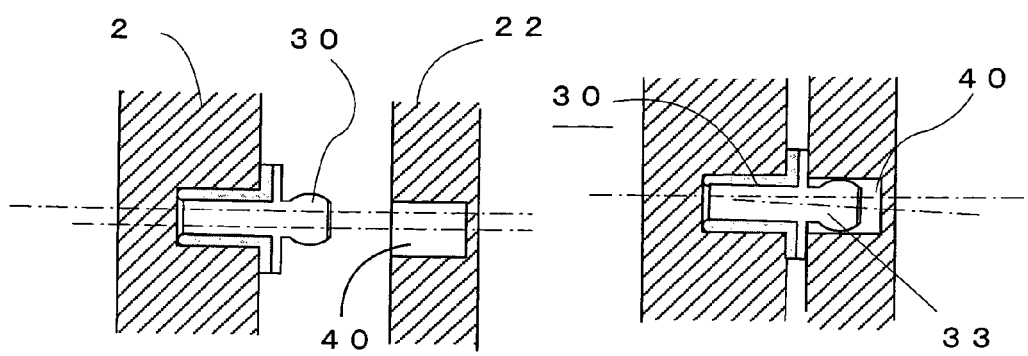
FIGS. 5(a) and 5(b) are diagrams showing the function of a holding member according to the present invention.
Figure 6:
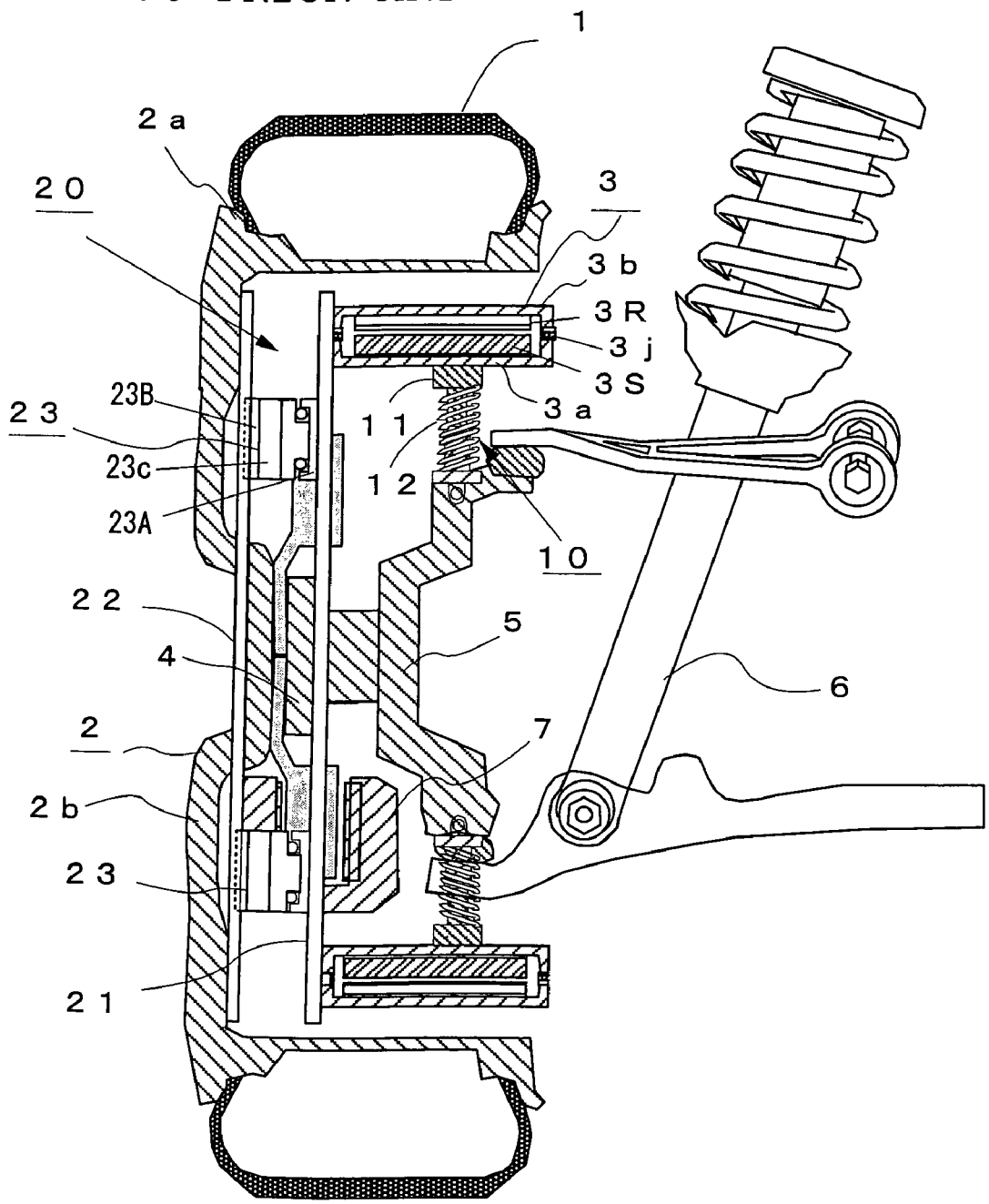
FIG. 6 is a diagram showing the constitution of an in-wheel motor system of the prior art.
Figure 7:
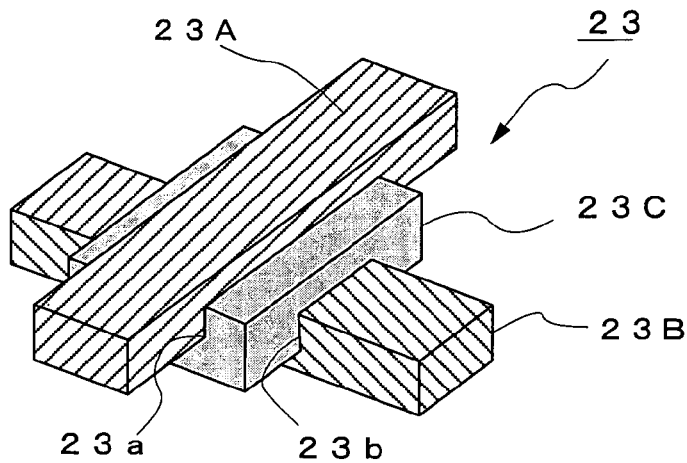
FIG. 7 is a diagram showing the constitution of a cross guide.
Figure 8:
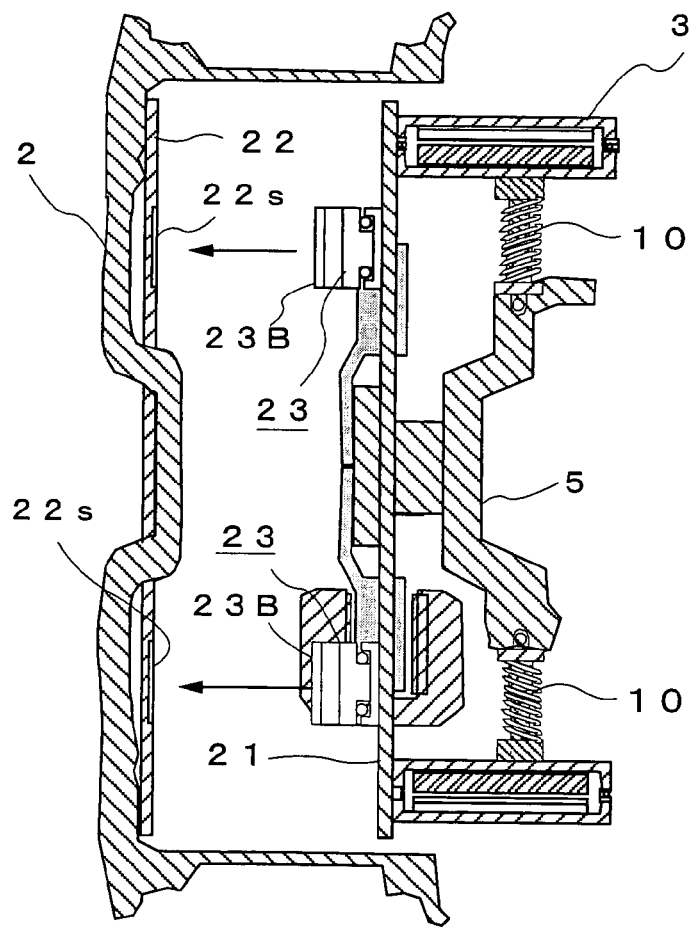
FIG. 8 is a diagram showing a method of installing an in-wheel motor system of the prior art.

Further, since the above connection pin 30 is held by the holding member 50 which is an elastic member and the pin head 33 which is a mating potion is spherical, if a mount of discrepancy between the position of the connection pin 30 and the position of the above guide hole 40 is larger than the above clearance, the above connection pin 30 is mated with the above guide hole 40 while it is slightly inclined as shown in FIG. 5(b), thereby making it possible to mount the above direct drive motor module to the above wheel 2 reliably.

When a slide bush is provided on a portion in contact with at least the above guide hole 40 of the above pin head 33 or the above contact portion is surface treated with a lubricating resin to provide a lubricating function to the above contact portion, the above connection pin 30 can be more easily inserted into the above guide hole 40. The same effect can be obtained when grease which is a lubricant is applied to the above contact portion.

Thus, according to this embodiment, when the direct drive motor module having the drive force transmission mechanism 20 comprising the hollow disk-like plates 21 and 22 for interconnecting the rotating side case 3b of the motor and the wheel 2 and the cross guides 23 for guiding the plates 21 and 22 in the vertical direction is to be mounted to the wheel 2, the plurality of attachment holes 2s are formed in the spoke portions 2c of the wheel 2, the fixing portions 31 of the connection pins 30 having a spherical pin head 33 which is a mating portion are fitted in the attachment holes 2s, and the guide holes 40 having a predetermined clearance relative to the outer diameter of the pin head 33 are formed in the wheel side plate 22 supporting the wheel 2 sides of the above cross guides 23, and the pin heads 33 of the above connection pins 30 are mated with the above guide holes 40 to mount the above direct drive motor module to the wheel 2. Therefore, even when the assembly accuracy is not so high, the direct drive motor module having the above drive force transmission mechanism 20 can be mounted to the wheel 2 reliably.

In the installation method of the present invention, the drive force of the motor 3 can be transmitted to the wheel 2 reliably as unrequired force is not applied to the cross guides 23.

When the fixing portions 31 of the above connection pins 30 are fitted in the attachment holes 2s of the above wheel 2 through the cylindrical holding members 50 which are elastic members, the direct drive motor module can be installed more easily.

In the above embodiment, the connection pins 30 are provided on the wheel 2, and the guide holes 40 are formed in the wheel side plate 22 of the drive force transmission mechanism 20. Even when the connection pins 30 are provided on the wheel side plate 22 and the guide holes 40 are formed in portions opposed to the connection pins 30 of the wheel 2, the same effect can be obtained.

In the above embodiment, the guide holes 40 are formed in the wheel-side plate 22. The guide holes for the connection pins 30 do not need to extend through the wheel side plate 22. The same effect can be obtained when guide grooves are formed.

It is possible that the above wheel side plate 22 is omitted, a guide groove is formed in the wheel side guide rail 23B of the cross guide 23, and the connection pin 30 is inserted into this guide groove. However, as the processing of the cross guide 23 which is a precision part is required and the positions of the spoke portions 2c provided with the connection pins 30 are limited, the wheel side plate 22 is preferably provided like this embodiment.

INDUSTRIAL FEASIBILITY

As having been described above, according to the present invention, even when the assembly accuracy is not so high, the direct drive motor module can be mounted to the wheel reliably, and the drive force of the motor can be transmitted to the wheel without fail, thereby making it possible to facilitate the assembly work and improve productivity.

What is claimed is:

1. An in-wheel motor system having a disk-like plate which is connected to a wheel and turns together with the rotor side of a direct drive motor module, comprising:
   a plurality of holes formed in a disk portion of the wheel;
   guide holes formed at positions corresponding to the holes of the disk-like plate; and
   connection pins for interconnecting the disk-like plate and the wheel, one ends of at least one of the connection pins is inserted into at least one of the plurality of holes and the other end of the at least one of the connection pins is inserted into at least one of the guide holes,
   wherein at least one of said one end of at least one of the connection pins is fixed in the hole and said other end of at least one of the connection pins is fixed in the guide hole.

2. The in-wheel motor system according to claim 1, wherein each of the connection pins has a substantially spherical mating portion to be mated with the guide hole or the hole at one end.

3. The in-wheel motor system according to claim 2, wherein each of the connection pins has a substantially cylindrical or substantially columnar fixing portion on a side opposite to the mating portion.

4. The in-wheel motor system according to claim 3, wherein each of the connection pins has a flange portion, which is arranged coaxially with the mating portion and the fixing portion and has an outer diameter larger than the diameter of the guide hole and the diameter of the hole, between the mating portion and the fixing portion.

5. The in-wheel motor system according to claim 3, wherein a cylindrical fixing member for holding and fixing the fixing portion, which is composed of an elastic member, is installed in the guide hole or the hole on the fixing portion insertion side.

6. The in-wheel motor system according to claim 1, further comprising a motor side plate connected to the rotor side of the direct drive motor module and a plurality of cross guides for interconnecting the motor side plate and the disk-like plate, which are arranged in the circumferential direction of the plates and whose moving directions on the front and rear sides cross each other.

7. The in-wheel motor system according to claim 6, wherein the stator side of the direct drive motor module is supported to a part around the wheel of a vehicle by an elastic body and/or an attenuation mechanism.

8. An in-wheel motor installation method for mounting a disk-like plate which turns together with the rotor side of a direct drive motor module to a wheel, comprising:
   inserting one ends of connection pins projecting toward the disk-like plate into a plurality of holes formed in a disk portion of the wheel;
   inserting the direct drive motor module from the inner side of the wheel while the disk-like plate and the disk portion are kept parallel to each other; and
   mating the other ends of the connection pins with guide holes formed at positions corresponding to the holes of the disk-like plates,
   wherein the operation of inserting said one ends of the connection pins occurs prior to said operation of inserting the direct drive motor module.

9. The in-wheel motor installation method according to claim 8, wherein each of the connection pins consists of a substantially spherical mating portion, a substantially cylindrical or substantially columnar fixing portion situated on a side opposite to the mating portion, and a flange portion interposed between the mating portion and the fixing portion, having an outer diameter larger than the diameter of the guide hole and the diameter of the hole, and arranged coaxial with the mating portion and the fixing portion, the fixing portion is held and fixed in the hole, and the mating portion is mated with the guide hole.

10. The in-wheel motor installation method according to claim 9, wherein a cylindrical fixing member composed of an elastic member is installed in the hole so that the fixing portion is held and fixed in the hole.

11. The in-wheel motor installation method according to claim 8, wherein a motor side plate is mounted to the rotor side of the direct drive motor module, and the motor side plate and the disk-like plate are interconnected by a plurality of cross guides which are arranged in the circumferential direction of the plates and whose moving directions on the front and rear sides cross each other so as to transmit the rotation of the motor to the wheel.

12. The in-wheel motor installation method according to claim 8, further comprising the step of supporting the stator side of the direct drive motor module to a part around the wheel of the vehicle by an elastic body and/or an attenuation mechanism.

* * * * *